May 6, 1969

J. LETTVIN 3,443,077

METHOD OF AND APPARATUS FOR CENTER OF GRAVITY COMPUTATION AND THE LIKE

Filed July 12, 1963

INVENTOR
JEROME LETTVIN

BY Rines and Rines

ATTORNEYS

INVENTOR
JEROME LETTVIN

BY Rines and Rines

ATTORNEYS

United States Patent Office 3,443,077
Patented May 6, 1969

3,443,077
METHOD OF AND APPARATUS FOR CENTER OF GRAVITY COMPUTATION AND THE LIKE
Jerome Lettvin, 22 Hilliard St., Cambridge, Mass. 02138
Filed July 12, 1963, Ser. No. 294,518
Int. Cl. G06g 7/32, 7/48, 7/74
U.S. Cl. 235—184                          15 Claims The present invention relates to computation methods and apparatus and, more particularly, to the determination of the center of gravity of a spectrum of information from three or more different views, regions or points thereof.

From perhaps its most elemental considerations, the invention may be illustrated in terms of a three-point weight or mass system definable by a triangle having the three weights concentrated at the apices, with the sum of the weights constant. The effective center of gravity of such a fixed triangle system may be readily obtained from a knowledge of the lengths of the triangle sides, the sum of the weights and two of the weights as later discussed in detail. Similarly, in colorimetry, three colors defining a triangle within or without the color spectrum diagram may be employed to determine the effective "center of gravity" of the diagram, which will then represent the resultant hue and saturation of the particular spectrum. Many other types of measurements or resultant vector calculations may similarly be resolved into this type of representation, including, as another illustration, the measurement of the voltage at the junction of three current-carrying resistors, one in series with parallel connection of the other two—the "center of gravity" of the system being similarly derived from Kirchoff's laws and representing the voltage at the common resistor junction. The term "center of gravity" may thus be generically employed and is hereinafter so used, to define the type of computation here-involved irrespective of the particular kind of information, data, or other variety of factors under consideration in this general transformation problem of barycentric computation.

An object of the invention, accordingly, is to provide a new and improved center of gravity computer and method of computation.

A further object is to provide novel analog barycentric computation circuits.

Still another object is to provide such circuits that are particularly adapted for providing a rough estimate of a variety of continuously variable data.

An additional object is to provide a novel colorimeter.

Other and further objects will be explained hereinafter and will be more particularly pointed out in the appended claims.

The invention will now be described in connection with the accompanying drawing, FIG. 1 of which is a geometric diagram illustrative of the center of gravity computation underlying the invention;

Figure 1:
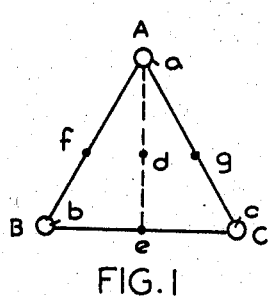

Referring to FIG. 1 and the simple illustrative mechanical case of a multi-mass distribution, a three-point weight system is illustrated in the form of triangle $a$, $b$, $c$, with weights A, B and C at the respective vertices. There is a center of gravity $e$ between weights B and C such that $$\frac{C}{B} = \left(\frac{be}{ce}\right) \quad (1)$$

The center of gravity between this and weight A is given by $$(C+B)(ed) = A(ad) \quad (2)$$

Thus, the following three relations obtain in terms of the triangle center of gravity $d$:

$$\frac{A}{A+B+C} = \left(\frac{ed}{ea}\right)$$

$$\frac{B}{A+B+C} = \left(\frac{gd}{gb}\right)$$

and $$\frac{C}{A+B+C} = \left(\frac{fd}{fc}\right) \quad (3)$$

If the distances $ab$, $bc$ and $ca$ are known, then it is only necessary, as before stated, to know the sum of the weights $A+B+C$ and two of the weights (A and B, or A and C, or B and C) to determine where the center of gravity $d$ lies.

Figure 2:
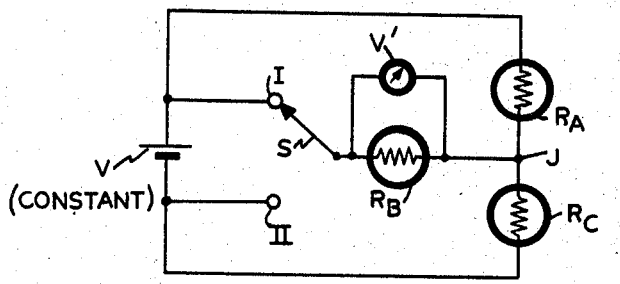
FIG. 2 is a simplified circuit diagram of a computer operating in accordance with the principles of the invention.

An electrical analog is represented in the circuit of FIG. 2 comprising three resistive elements $R_A$, $R_B$, $R_C$ connected as a T network of respective conductances $$\frac{1}{g_A}, \frac{1}{g_B}$$

and $$\frac{1}{g_C}$$

and that, in position I of switch S, applies current from a constant voltage source V, schematically illustrated as a battery but, in actual practice, of any desired type, including of periodic waveform, to series-connected elements $R_B$ and $R_C$ and element $R_A$ connected in shunt with element $R_B$. The voltage $E_A$ measured in the voltmeter V' at the common junction J is then given by $$\frac{E_A}{V} = \frac{g_A}{g_A + g_B + g_C} \quad (4)$$

With the switch S in position II, connecting the left-hand terminal of $R_B$ to the opposite or negative side of the source V, the voltage $E_B$ across $R_C$ is determined by $$\frac{E_B}{V} = \frac{g_B}{g_A + g_B + g_C} \quad (5)$$

and if a further circuit connection were established such that $g_C$ and $g_B$ are in series with the source V and $g_A$ is in shunt with $g_B$, the voltage $E_C$ across $R_A$ will be $$\frac{E_C}{V} = \frac{g_C}{g_A + g_B + g_C} \quad (6)$$

The analogy to the weight or mass center of gravity set of Equations 3 is thus evident, the resistive net of FIG. 2 enabling computation of center of gravity with voltage employed as the analog of distance, and conductance as the analog of weight.

Figure 3:
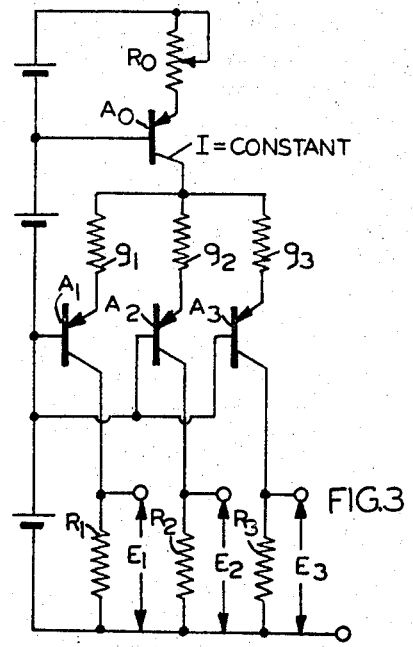
FIG. 3 is a similar diagram of a circuit enabling simultaneous outputs corresponding to each of the three conductances.

In the circuit of FIG. 3, the three conductances $g_1$, $g_2$, and $g_3$ of a parallel-arm network are fed from a constant current source comprising a transistor $A_0$ having an adjustable emitter resistor $R_0$ and the collector of which applies constant adjusted current I to each of the conductances. The conductances, in turn, are respectively connected to the emitters in the input circuits of corresponding transistor amplifiers $A_1$, $A_2$ and $A_3$, the bases of which are interconnected and the collectors of which are connected through respective output-circuit loads $R_1$, $R_2$ and $R_3$ to produce simultaneous outputs thereacross given by $$E_1 = \frac{g_1}{g_1+g_2+g_3} I R_1$$

$$E_2 = \frac{g_2}{g_1+g_2+g_3} I R_2$$

and $$E_3 = \frac{g_3}{g_1+g_2+g_3} I R_3 \quad (7)$$

Clearly, only two such measures are required, as previously discussed. If, for example, the mass B of FIG. 1 is placed at the origin of an $x$–$y$ plane coordinate system and the triangle side $bc$ is laid along the $x$-axis, with the included angle between sides $ba$ and $bc$ being represented by the angle $\theta$, then the $x$- and $y$-coordinates of the center of gravity $d$ are $$x = \frac{C + A(ab \cos \theta)}{A+B+C}$$

and $$y = \frac{A(ab \sin \theta)}{A+B+C} \quad (8)$$

This can be further generalized, however, for an arbitrary distribution of masses or weights in the plane so that the coordinates of the center of gravity can be computed from any reference point:

$$\bar{x} = \frac{\sum M_k (r_k \sin \theta_k)}{\sum M_k}$$

and $$\bar{y} = \frac{\sum M_k (r_k \cos \theta_k)}{\sum M_k} \quad (9)$$

where $M_k$ is the mass at a point $r_k$ distant from the reference at the angle $\theta_k$.

Figure 4:
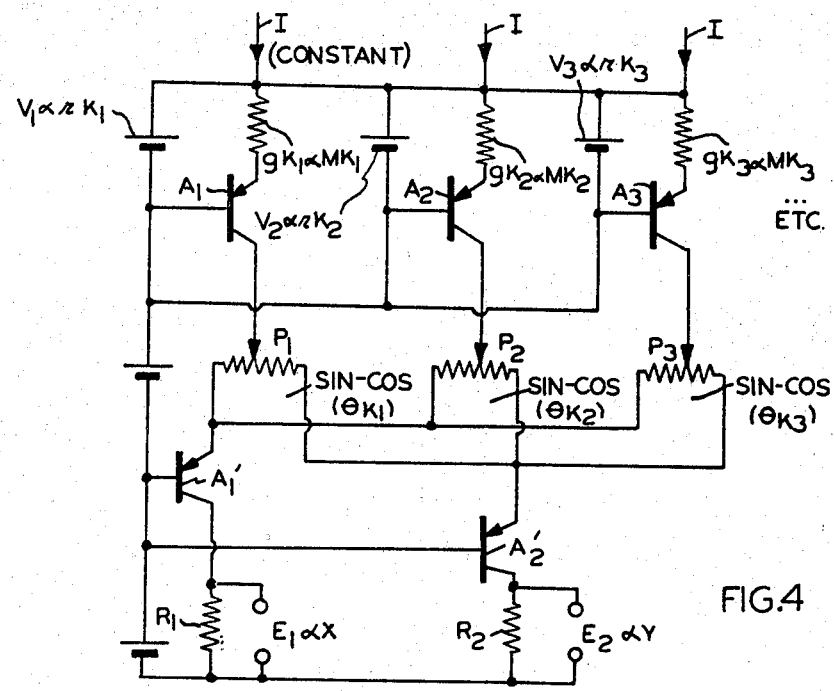
FIGS. 4 and 5 are schematic circuit diagrams of more generalized computer circuits for simultaneously obtaining the X and Y coordinates of center of gravity.

Computation of this generalized set of equations may be effected, for example, with the circuit of FIG. 4 in which the conductances $g_{k_1}$, $g_{k_2}$, $g_{k_3}$, etc. (respectively proportional to masses $M_{k_1}$, $M_{k_2}$, $M_{k_3}$, etc.) are similarly connected with the emitters of the amplifiers $A_1$, $A_2$, $A_3$, etc., the collectors of which tap off from respective parallel-connected sine-cosine potentiometers $P_1$, $P_2$, $P_3$, etc. associated with angles $\theta_{k_1}$, $\theta_{k_2}$, $\theta_{k_3}$, etc. Each conductance $g_{k_1}$, $g_{k_2}$, $g_{k_3}$, etc. is driven by a separate voltage source $V_1$, $V_2$, $V_3$, etc., respectively adjusted to be proportional to the distances from the reference $r_{k_1}$, $r_{k_2}$, $r_{k_3}$, etc. Output amplifiers $A_1'$ and $A_2'$ have their emitters respectively connected to the opposite terminals of the potentiometers and their collectors connected to the respective load resistors $R_1$ and $R_2$, thus producing across $R_1$ and $R_2$ output voltages $E_1$ and $E_2$ respectively proportional to the $x$ and $y$ coordinates of the center of gravity.

Figure 5:
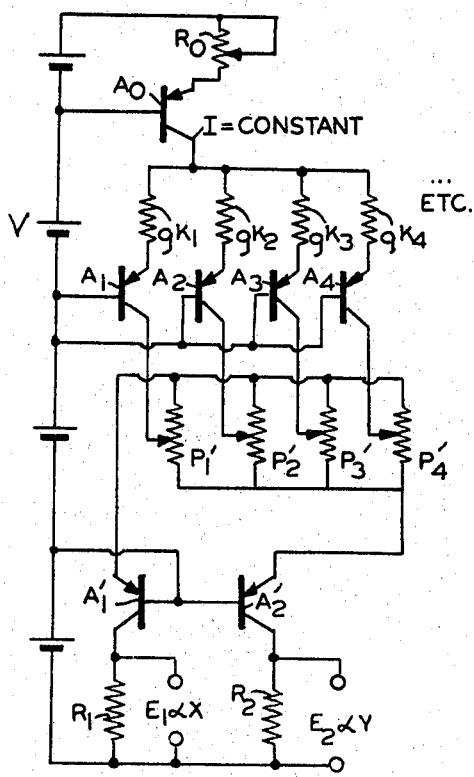

The circuit of FIG. 4, moreover, may be simplified to the form of FIG. 5 wherein the conductances $g_{k_1} \ldots g_{k_4}$, etc. are adjusted to be proportional to the products $r_{k_1} M_{k_1} \ldots r_{k_4} M_{k_4}$, etc. and operate with a common voltage source $V$, and the potentiometers $P_1' \ldots P_4'$, etc. provide the ratios of conductances tapped off thereon that correspond to $\sin \theta_{k_1} / \cos \theta_{k_1} \ldots$ etc., so that the outputs $E_1$ and $E_2$ are again obtained, respectively proportional to center-of-gravity coordinates $x$ and $y$, normalized to a unit area around the reference point.

Figure 6:
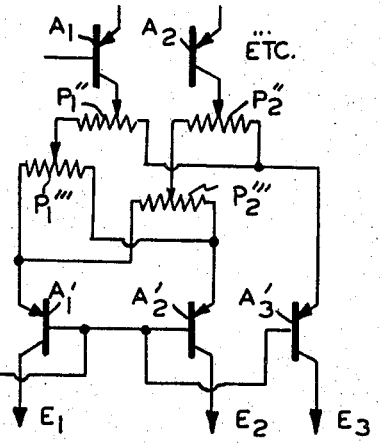

The general barycentric computation technique above discussed, moreover, may be further generalized to three dimensions by three-pole distributing potentiometers $P_1''$, $P_2''$, etc. and $P_1'''$, $P_2'''$, etc., the former of which tap off the latter as illustrated in FIG. 6, and with the aid of three output or collecting transistors $A_1'$, $A_2'$ and $A_4'$ providing three coordinate output voltages in the manner of FIGS. 4 and 5.

Figure 7:
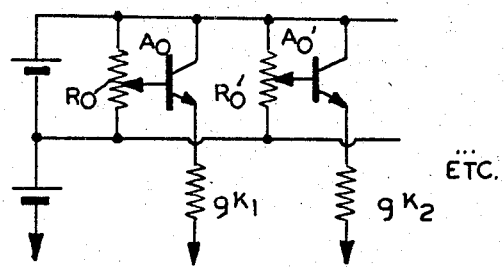
FIGS. 6 and 7 are partial circuit diagrams of modified portions of the circuits of FIGS. 4 and 5, and of FIGS. 3 to 5, respectively.

If second moments are desired, not normalized to unit area, furthermore, the constant current source may be modified in the systems of FIGS. 3 to 6 to adjust the voltage sources provided by $A_0$, $A_0'$, etc. of FIG. 7, associated with each of the conductance elements $g_{k_1}$, $g_{k_2}$, etc., to vary as $r_{k_1}^2$, $r_{k_2}^2$, etc.

While the circuits above discussed may be generally employed, highly useful colorimetric instruments can be constructed utilizing the principles thereof. Thus, the resistances $R_A$, $R_B$, $R_C$ of FIG. 2 may comprise photoresistors $R_{red}$, $R_{blue}$ and $R_{green}$ in FIG. 8, respectively associated with color filters to provide overall predetermined overlapping spectral response curves $S_1$, $S_2$, $S_3$, FIG. 9, peaked in the red, blue and green, respectively. The photoresistors, of any desired well-known type, such as cadmium sulfide or cadmium selenide, have a substantially linear relationship of their conductance to the power of incident light of fixed spectral composition. The conductances $g_{red}$, $g_{blue}$ and $g_{green}$ of the respective photoresistors with their overlaid filters are thus adjusted so that their variations as a function of incident light wavelength correspond to the respective spectral response curves of FIG. 9. The $x$ and $y$ coordinates of the center of gravity, representative of the resultant hue and saturation, may be indicated alternately on meters $V_1'$ and $V_2'$ (see Equations 4 and 5, above) as the switches S and S' are synchronously moved back and forth between respective positions I–II and I'–II'. The source V, with such operation of switch S, thus becomes a periodic or chopper-like constant voltage source. The indicators $V_1'$, $V_2$ may clearly be replaced by other indicating devices, including an $x$–$y$ recorder. Thus, a particular spectral composition of light playing simultaneously on all three photoresistor elements of FIG. 8 uniquely determines a center of gravity point within the color triangle independent of the intensity of the light. Since every wavelength in the overlapping responses $S_1$, $S_2$, $S_3$ of FIG. 9 has a descriptive set of three numbers on these three response curves, the passing of light through a filter having the spectral response characteristic of one of the three filters associated with the photoresistors will produce a resultant color having a particular wavelength much desaturated; the sole requirement on the filters being that the boundary of the color triangle describes a curve of loci of centers of gravity which is a linear projection of the well-known ICI color spectrum curve.

Figure 8:
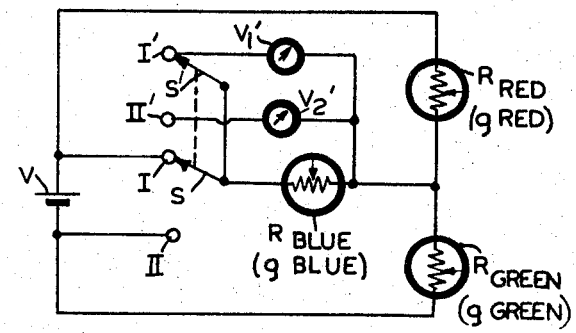
FIG. 8 is a diagram similar to FIG. 2 of a colorimeter.
Figure 9:
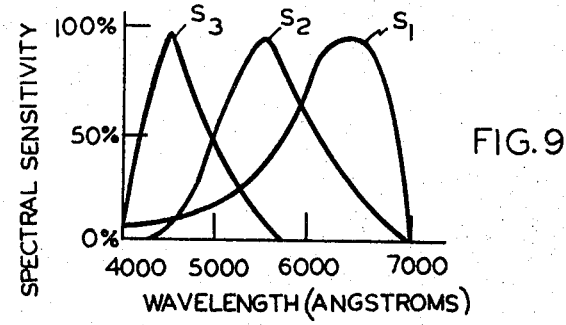
FIG. 9 is a spectral graph explanatory of the operation of the system of FIG. 8.

Similarly, the circuits of the other embodiments of the invention may be used for colorimetry with appropriate photoresistor-filter or other light-to-electrical response transducers employed to provide the conductances $g$, as explained in connection with FIG. 8. Barycentric operations in other portions of the electromagnetic-wave spectrum may also be similarly effected, as, for example, the erecting of arbitrary color spaces to separate or identify chemicals or mixtures thereof. It is also possible to make a set of different color spaces covering the same spectrum, thus to increase the resolution with respect to spectral composition; or to provide a barycentric operation on such a set of color spaces to arrive at a second or higher order of color.

As previously explained, moreover, the invention is of much broader application for many other kinds of measurement. The invention enables the combination into a single weighted measure of a number of separate distinct types of measure on the same substrate, providing each measure can be transformed into a conductance, or an equivalent thereof for the purposes herein, that varies with the measure. Strain-gauges, thermistors, accelerometers and all other such transducers $R_A$, etc. may clearly be used to provide the conductances $g$ of the various circuits of FIGS. 2 to 8, provided they can be adjusted to exhibit a conductance change that is substantially a linear, or smooth and monotonic function of the property to be sensed or transduced. Other suitable transducer and/or sensors include, as further illustrations, polarographic electrodes (dropping mercury or platinum), pressure-sensitive resistances, poisonable electrodes (used to measure impurities), a fluid column in a stretchable tube (used to measure extension, for example), and potentiometers coupled directly or via power amplifiers to display by conductance variation a measure of the property being sensed, to mention but a few. Clearly, other types of amplifiers or relays than the transistors shown in FIGS. 3 to 8 may also be employed, as may different types of voltage and current sources. Further modifications will also occur to those skilled in the art, and all such are considered to fall within the spirit and scope of the invention as defined in the appended claims.

What is claimed is:

1. Apparatus for computing the effective "center of gravity" of a plurality of measures having, in combination, at least three electrical conductance elements the respective conductance values of which are adjusted in accordance with three separate measures, an electric circuit connecting the elements as a T network with two of the elements in series and a terminal of the third element common with the series-connecting terminal of the said two elements, means for connecting a constant voltage source in series with the said two elements, means for connecting the other terminal of the said third element to one side of the source, and means for indicating the voltage developed at the said common terminal to determine one of the coordinates of the said center of gravity.

2. Apparatus as claimed in claim 1 and in which means is provided for connecting the said other terminal of the said third element to the other side of the said source to provide a voltage at the said common terminal, as indicated by the indicating means, determinative of another of the said coordinates.

3. Apparatus as claimed in claim 2 and in which means is provided for alternately connecting the said third-element other terminal to opposite sides of the said source and for simultaneously indicating the resulting different voltages at the said common terminal corresponding to two of the said coordinates.

4. Apparatus as claimed in claim 3 and in which the said elements comprise sensor means for effecting the transducing of a sensed property producing the said measure into a value of electrical conductance.

5. Apparatus as claimed in claim 4 and in which the sensor means has a linear conductance variation with sensed property variation.

6. Apparatus as claimed in claim 1 and in which the said elements comprise sensor means for effecting the transducing of a sensed property producing the said measure into a value of electrical conductance.

7. Apparatus as claimed in claim 6 and in which the sensor means has a linear conductance variation with sensed property variation.

8. Apparatus for computing the effective "center of gravity" of a plurality of measures having, in combination, at least three electrical conductance elements the respective conductance values of which are adjusted in accordance with three separate measures, an electric circuit connecting all three elements to a common terminal and each element to an associated load means, each of the load means comprising an amplifier and an output resistance, means for connecting a constant current source to the said common terminal, and means for indicating the voltage developed across at least one of the load means to determine a coordinate of the said center of gravity.

9. Apparatus as claimed in claim 8 and in which each amplifier has an input and an output circuit, the elements being connected in the input circuits of the respective amplifiers and the output resistances being connected in the output circuits of the respective amplifiers.

10. Apparatus as claimed in claim 9 and in which the amplifiers are transistors having a common base connection, the output resistances have a common terminal, and a further source of voltage is connected between the common base connection and said common terminal of the output resistances.

11. Apparatus as claimed in claim 9 and in which the said resistances comprise sine-cosine potentiometers.

12. Apparatus as claimed in claim 11 and in which further coordinate output amplifiers are connected to the potentiometers.

13. Apparatus as claimed in claim 12 and in which the said potentiometers are connected in parallel and the coordinate output amplifiers are connected to the terminals thereof.

14. Apparatus as claimed in claim 9 and in which the constant current source comprises adjustable transistor amplifier means.

15. Apparatus as claimed in claim 1 and in which the said measures are light wavelengths and the said elements comprise photoresistive-filter elements optimally responsive to different wavelengths.

References Cited

UNITED STATES PATENTS

| | | | |
|---|---|---|---|
| 2,601,382 | 6/1952 | Fubini | 235—184 |
| 2,623,916 | 12/1952 | Welz | 235—179 |
| 2,907,950 | 10/1959 | Raisbeck | 235—151 |
| 2,965,703 | 12/1960 | Loughlin | 235—184 |
| 3,072,795 | 1/1963 | Badmaieff | 250—210 |
| 3,248,549 | 4/1966 | Sanabria | 250—210 |

MALCOLM A. MORRISON, *Primary Examiner.*

JOSEPH F. RUGGIERO, *Assistant Examiner.*

U.S. Cl. X.R.

235—179; 307—229